United States Patent Office 3,534,063
Patented Oct. 13, 1970

3,534,063
PHOTOCHROMIC CYCLOHEXADIENE COMPOUNDS
Kenneth Robert Huffman, Stamford, Conn., and Edwin Fisher Ullman, Atherton, Calif., assignors to American Cyanamid Company, Stamford, Conn., a corporation of Maine
No Drawing. Continuation-in-part of application Ser. No. 588,702, Oct. 24, 1966. This application Mar. 29, 1968, Ser. No. 717,412
Int. Cl. C07d 7/44
U.S. Cl. 260—335    9 Claims

ABSTRACT OF THE DISCLOSURE

Photochromic cyclohexadiene compounds of the formula

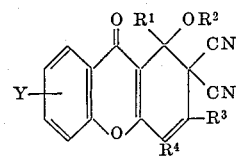

wherein Y is hydrogen, alkyl, phenyl, alkyl-substituted phenyl, hydroxy, alkoxy, alkylthio, acyloxy, cyano, nitro amino, halogen or trifluoromethyl; $R^2$ is hydrogen or acyl; $R^1$ is Y-phenyl where Y is as defined above, $R^3$ is hydrogen, alkyl, phenyl or cyano; and $R^4$ is alkyl. When $R^2$ is alkanoyl and $R^3$ is hydrogen, the other substituents being as defined above, the color that develops upon activation by light does not fade rapidly when the activating light is removed.

---

This is a continuation-in-part of our copending application Ser. No. 588,702 filed Oct. 24, 1966, now abandoned.

This invention relates to photochromic cyclohexadiene compounds of the formula

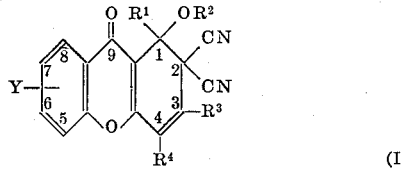
(I)

wherein Y is hydrogen, alkyl, phenyl, alkyl-substituted phenyl, hydroxy, alkoxy, alkylthio, acyloxy, cyano, nitro, amino, halogen or trifluoromethyl; $R^2$ is hydrogen or acyl; $R^1$ is phenyl or substituted phenyl wherein the substituents are alkyl, hydroxy, alkoxy, alkylthio, cyano, nitro, amino, halogen or trifluoromethyl; $R^3$ is hydrogen, alkyl, phenyl, or cyano; and $R^4$ is alkyl.

Alkyl in alkyl, alkoxy, alkylthio, or alkyl-substituted phenyl of Formula I above may contain from one to eighteen carbon atoms inclusive but preferably is lower alkyl ($C_1$–$C_8$). Acyl includes

and acyloxy includes

wherein $R_5$ is aliphatic (e.g., $C_1$–$C_8$), aromatic (e.g., phenyl or naphthyl) or hydrogen. Amino includes $NH_2$, monoalkylamino or dialkylamino wherein alkyl is preferably lower alkyl ($C_1$–$C_8$). Halogen includes chloro, bromo, iodo and fluoro. From the definition of Formula I it will be noted that the substituents may each be different or, in some cases, two or more may be the same.

The foregoing description is but typical of the many substituents effective as Y, $R^1$, $R^2$ and $R^3$, it being understood that other substituents which do not inhibit the photochromic character of the compound will also be suitable.

These compounds are prepared conveniently and in known processes as fully described in copending application Ser. No. 681,936 filed Nov. 9, 1967, with the exception that the compounds and processes therein disclosed differ in limitation of $R^4$ of Formula I above to phenyl and substituted phenyl. In the present application, $R^4$ is alkyl. As typical of one of the syntheses may be mentioned reaction of the appropriate chromone compound with a strong base such as sodium hydride to form the anionic conjugate base, followed by reaction at reflux in an inert organic solvent with a cyanoethylene compound as follows where Z is a leaving group such as lower alkoxy, phenoxy, halogen, cyano, sulfonoxy, and the like:

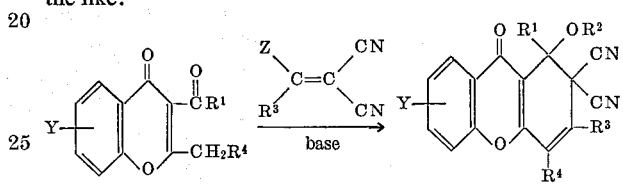

The chromone reactants are known compounds or may be prepared in a known manner so as to contain $R^4$ as alkyl. Our U.S. Pat. No. 3,331,859 dated July 18, 1967 discloses such chromones and synthesis.

The compounds of the invention exhibit photochromism, usually by ultraviolet irradiation, and are therefore useful in the manufacture of articles such as sunglasses, novelty toys, jewelry, and variable light transmission devices such as windows, photocopying machines and materials, optical masks, and the like.

Photochromic films, moldings or coatings, containing compounds of the invention in solution or as dispersed solids are particularly useful embodiments. Typical films are prepared by dissolving the compound in a suitable solvent such as benzene and adding this solution to a thermoplastic polymer solution. A representative composition is a 20% by weight solids mixture containing polymethylmethacrylate and photochromic compound (95% polymer to 5% photochromic compound). The composition is then spread on a suitable substrate such as polyester film and the solvent evaporated. The resulting article is useful as an optical mask, memory tape or sunvisor.

Exceptionally intense coloration is exhibited by the compounds of the invention, or by articles or compositions incorporating said compounds, on exposure to visible or near ultraviolet wavelengths of light.

In most of these compounds the color fades rapidly in the dark. We have found, however, that certain of our compounds are unusual in this respect, they develop color when activated by light, but the color does not fade rapidly when the activating light is removed. These are the compounds of Formula I wherein $R^1$ is phenyl or substituted phenyl and $R^2$ is alkanoyl, as hereinbefore defined, $R^3$ is hydrogen, and $R^4$ is alkyl and Y is as defined above. A typical compound of this type has the formula

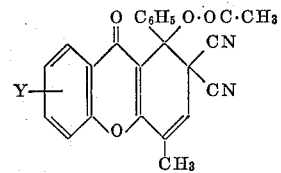

Its preparation is described in Example 26.

The following examples further illustrate the invention but are not limitative thereof except as indicated in the appended claims. All parts and percentages are by weight unless otherwise specified.

EXAMPLE 1

1-hydroxy-4-methyl-9-oxo-1-phenyl-2,2,3[1H] xanthenetricarbonitrile

A solution of 0.55 gram of 3-benzoyl-2-ethyl-chromone in 5 milliliters of dry tetrahydrofuran was added dropwise under nitrogen to a stirred suspension of 0.25 gram of 50% sodium hydride in 10 milliliters tetrahydrofuran. The deep red solution was brought to reflux, cooled, and treated with 0.28 gram of tetracyanoethylene. The reaction mixture was stirred at room temperature for an hour and then refluxed for another hour. The solvent was evaporated and the residue dissolved in ice water, extracted with methylene chloride to remove the mineral oil, and then acidified with dilute hydrochloric acid. The aqueous mixture was extracted three times with methylene chloride and the dried extracts were evaporated to dryness. Trituration of the residue with ether gave 0.42 gram (55%) of crude product, melting point 215–217° C. (decomposition). Two recrystallizations from methylene chloride-petroleum ether afforded tan crystals, melting point 222–227° C. (decomposition).

*Analysis.*—Calc'd for $C_{23}H_{13}N_3O_3$ (percent): C, 72.81; H, 3.45; N, 11.08. Found (percent): C, 73.06; H, 3.70; N, 11.39.

EXAMPLE 2

1-hydroxy-4-methyl-9-oxo-1-phenyl-2,2[1H] xanthenedicarbonitrile

A solution of 5.55 grams of 3-benzoyl-2-ethyl-chromone in 65 milliliters of benzene was added dropwise to a stirred suspension of 1.2 grams of 50% sodium hydride in 50 milliliters of benzene. The resulting mixture was refluxed with stirring for 20 minutes, cooled, and treated dropwise with a solution of 4.3 grams methoxymethylenemalononitrile in 100 milliliters benzene. Refluxing and stirring was continued for 5½ hours during which time a red-orange solid slowly formed. The cooled mixture was filtered and the solid was dissolved in water and the solution acidified with dilute hydrochloric acid. The aqueous mixture was extracted several times with chloroform and the dried extracts were evaporated to dryness. Trituration of the residue with ether gave 2.5 grams (35%) of tan solid, melting point 187–194° C. (decomposition). Two recrystallizations from methylene chloride-petroleum ether gave a colorless solid, melting point 190–192° C. (decomposition).

EXAMPLE 3

1-hydroxy-4-methyl-9-oxo-1-(p-methoxyphenyl)-2,2[1H] xanthenedicarbonitrile

The procedure of Example 2 was repeated in all essential details except for use of 5.7 grams of 2-ethyl-3-(p-methoxybenzoyl)chromone, 1.1 grams of 50% sodium hydride, and 4.0 grams of methoxymethylenemalononitrile. The yield was 1.33 grams (19%, melting point 190–193° C. (decomposition).

*Analysis.*—Calc'd for $C_{23}H_{16}N_2O_4$ (percent): C, 71.87; H, 4.20; N, 7.29. Found (percent): C, 71.49; H, 4.09; N, 7.55.

EXAMPLES 4–25

Table I below illustrates other compounds of the invention which are prepared substantially as described in Examples 1–3. Formula I is given for convenience in determining the identity of the substituents.

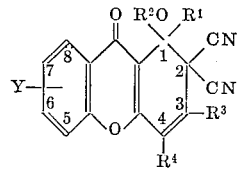

| Example | R¹ | R² | R³ | R⁴ | Y |
|---|---|---|---|---|---|
| 4 | p-Cyanophenyl | Hydrogen | Hydrogen | Methyl | Hydrogen. |
| 5 | p-Nitrophenyl | do | do | Ethyl | Do. |
| 6 | Phenyl | Propionyl | Ethyl | do | Do. |
| 7 | p-Hydroxyphenyl | Hydrogen | Phenyl | Methyl | Do. |
| 8 | m-Trifluoromethylphenyl | do | Cyano | do | 6-dimethylamino. |
| 9 | p-Dimethylaminophenyl | do | do | do | Hydrogen. |
| 10 | p-Methoxyphenyl | Acetyl | Hydrogen | do | Do. |
| 11 | o-Fluorophenyl | Hydrogen | do | n-Undecyl | Do. |
| 12 | p-Methylthiophenyl | do | do | Methyl | Do. |
| 13 | m-Bromophenyl | do | do | do | Do. |
| 14 | p-(n-Propyl)phenyl | do | do | do | Do. |
| 15 | Phenyl | do | Cyano | do | 6-phenyl. |
| 16 | do | do | Methyl | do | 7-methyl. |
| 17 | do | do | Hydrogen | do | 6-(p-tolyl). |
| 18 | do | do | do | i-Propyl | 8-methoxy. |
| 19 | do | do | do | Methyl | 5-chloro. |
| 20 | do | do | do | do | 7-trifluoromethyl. |
| 21 | do | do | Cyano | do | 6-hydroxy. |
| 22 | do | Acetyl | do | do | 6-acetoxy. |
| 23 | do | Hydrogen | Hydrogen | do | 8-ethylthio. |
| 24 | do | do | do | do | 7-nitro. |
| 25 | do | do | do | do | 7-cyano. |

EXAMPLE 26

1-acetoxy-4-methyl-9-oxo-1-phenyl-2,2[1H] xanthenedicarbonitrile

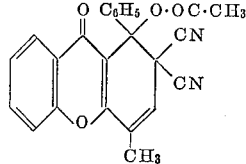

A suspension of 1.0 g. of the 1-hydroxy-4-methyl-9-oxo-1-phenyl-2,2[1H] xanthenedicarbonitrile of Example 2 in 30 ml. of acetic anhydride was treated with 2 drops of concentrated sulfuric acid with shaking. After standing for 15 minutes at 25° C. the solution was poured into ice water and the aqueous mixture was stirred until crystallization was complete. The product was filtered and recrystallized from benzene-methanol to give 0.78 g. (70%) of the acetate, M.P. 194–196° dec.

*Analysis.*—Calc'd for $C_{24}H_{16}N_2O_4$ (percent): C, 72.72; H, 4.07; N, 7.07. Found (percent): C, 72.72; H, 4.17; N, 7.02.

This product is colorless when freshly prepared, and upon irradiation with ultraviolet light it changes to red-orange in color and does not rapidly revert to colorless.

We claim:

1. A photochromic cyclohexadiene compound of the formula:

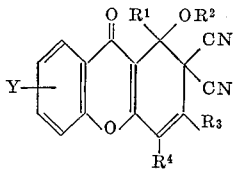

wherein Y is hydrogen, alkyl of 1 to 18 carbon atoms, phenyl, lower alkyl-substituted phenyl, hydroxy, lower alkoxy, lower alkylthio, acetoxy, cyano, nitro, di-lower alkyl amino, halogen, or trifluoromethyl; $R^1$ is phenyl or substituted phenyl wherein the substituents are lower alkyl, hydroxy, lower alkoxy, lower alkylthio, cyano, nitro, dimethylamino, halogen or trifluoromethyl; $R^2$ is hydrogen or

where $R^5$ is $C_1$–$C_8$ aliphatic, phenyl, naphthyl or hydrogen; $R^3$ is hydrogen, alkyl of 1–18 carbon atoms, phenyl, or cyano; and $R^4$ is alkyl of 1–18 carbon atoms.

2. The compound of claim 1 wherein Y and $R^2$ are hydrogen, $R^1$ is phenyl, $R^3$ is cyano, and $R^4$ is methyl.

3. The compound of claim 1 wherein Y, $R^2$ and $R^3$ are hydrogen, $R^1$ is phenyl, and $R^4$ is methyl.

4. The compound of claim 1 wherein Y, $R^2$ and $R^3$ are hydrogen, $R^1$ is p-methoxyphenyl, and $R^4$ is methyl.

5. The compound of claim 1 wherein Y, $R^2$ and $R^3$ are hydrogen, $R^1$ is p-cyanophenyl, and $R^4$ is methyl.

6. The compound of claim 1 wherein Y and $R^2$ are hydrogen, $R^1$ is p-dimethylaminophenyl, $R^3$ is cyano, and $R^4$ is methyl.

7. The compound of claim 1 wherein $R^1$ is phenyl, $R^2$ is alkanoyl in which the alkyl contains from 1–8 carbon atoms, $R^3$ is hydrogen, and $R^4$ is alkyl of 1–18 carbon atoms.

8. The compound of claim 1 wherein $R^1$ is phenyl, $R^2$ is $CH_3CO$—, $R^3$ is hydrogen, $R^4$ is methyl, and Y is hydrogen.

9. A photochromic cyclohexadiene compound of the formula

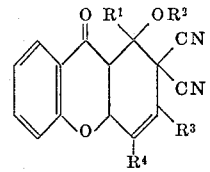

in which $R^1$ is phenyl or substituted phenyl wherein the substituents are lower alkyl, hydroxy, lower alkoxy, lower alkylthio, cyano, nitro, dimethylamino, halogen or trifluoromethyl; $R^2$ is hydrogen or

where $R^5$ is $C_1$–$C_8$ aliphatic, phenyl, naphthyl, or hydrogen; $R^3$ is hydrogen, alkyl of 1–18 carbon atoms, phenyl or cyano; and $R^4$ is alkyl of 1–18 carbon atoms.

No references cited.

NORMA S. MILESTONE, Primary Examiner

U.S. Cl. X.R.

106—287; 117—33.3, 138.8

UNITED STATES PATENT OFFICE
CERTIFICATE OF CORRECTION

Patent No. 3,534,063                    Dated  October 13, 1970

Inventor(s) Kenneth Robert Huffman and Edwin Fisher Ullman

It is certified that error appears in the above-identified patent and that said Letters Patent are hereby corrected as shown below:

Col. 4, lines 15 - 20 the formula should read:

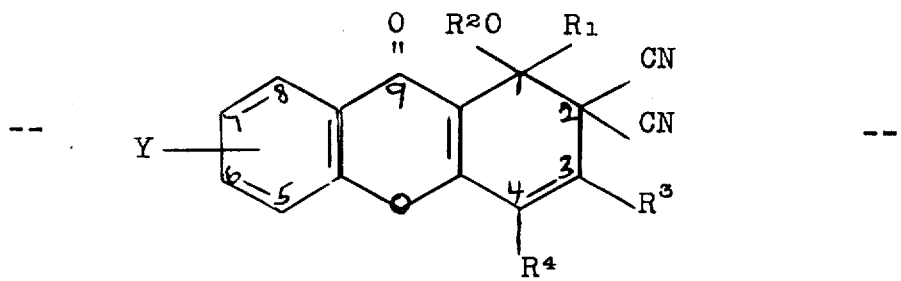

Col. 6, in claim 9, the formula should read:

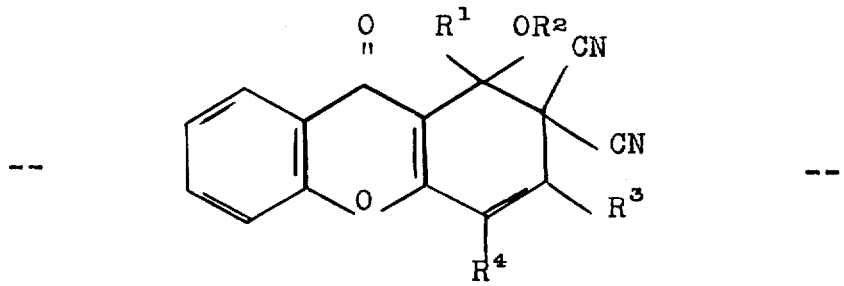

Signed and sealed this 6th day of June 1972.

(SEAL)
Attest:

EDWARD M. FLETCHER, JR.
Attesting Officer

ROBERT GOTTSCHALK
Commissioner of Patents